Patented Jan. 28, 1936

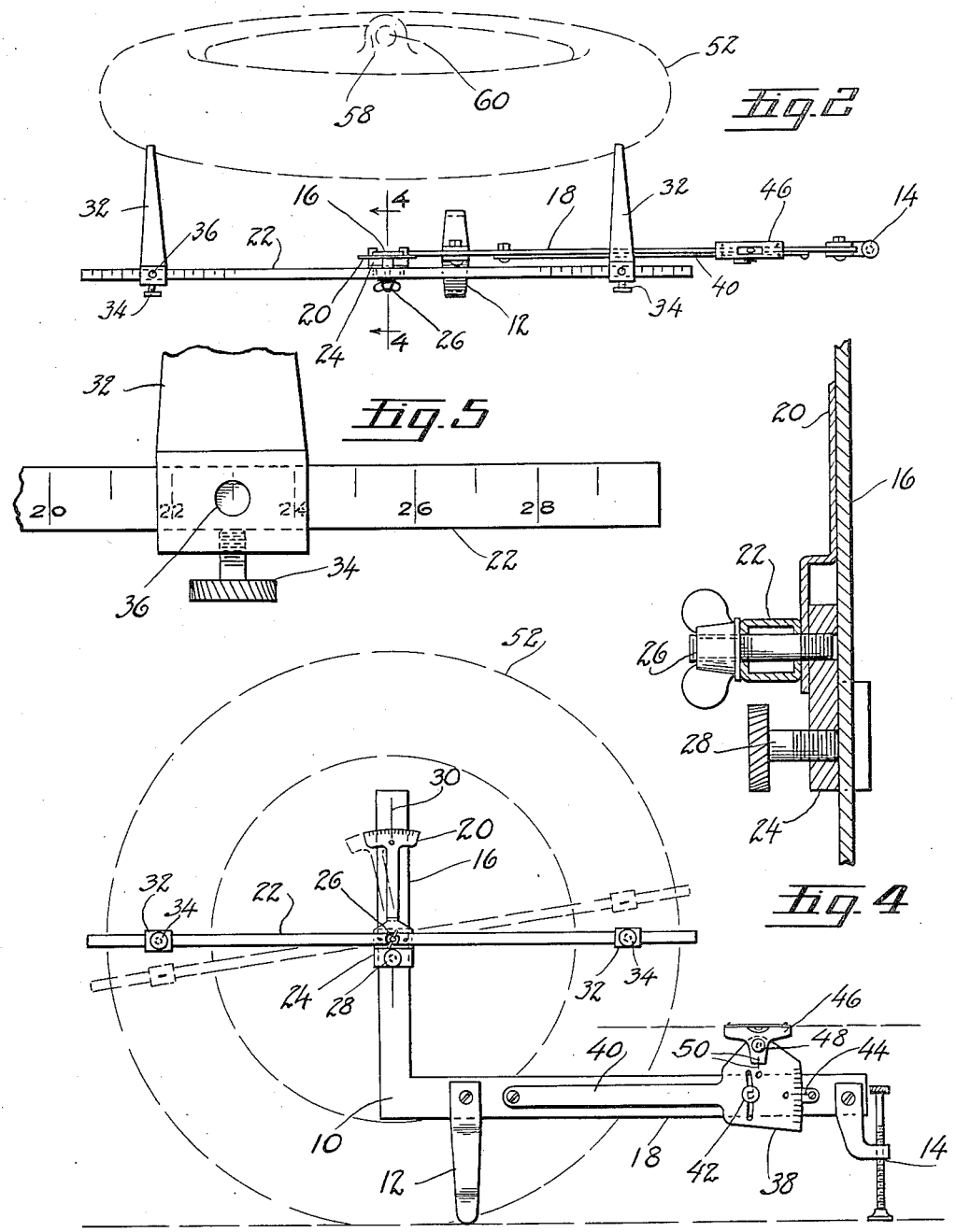

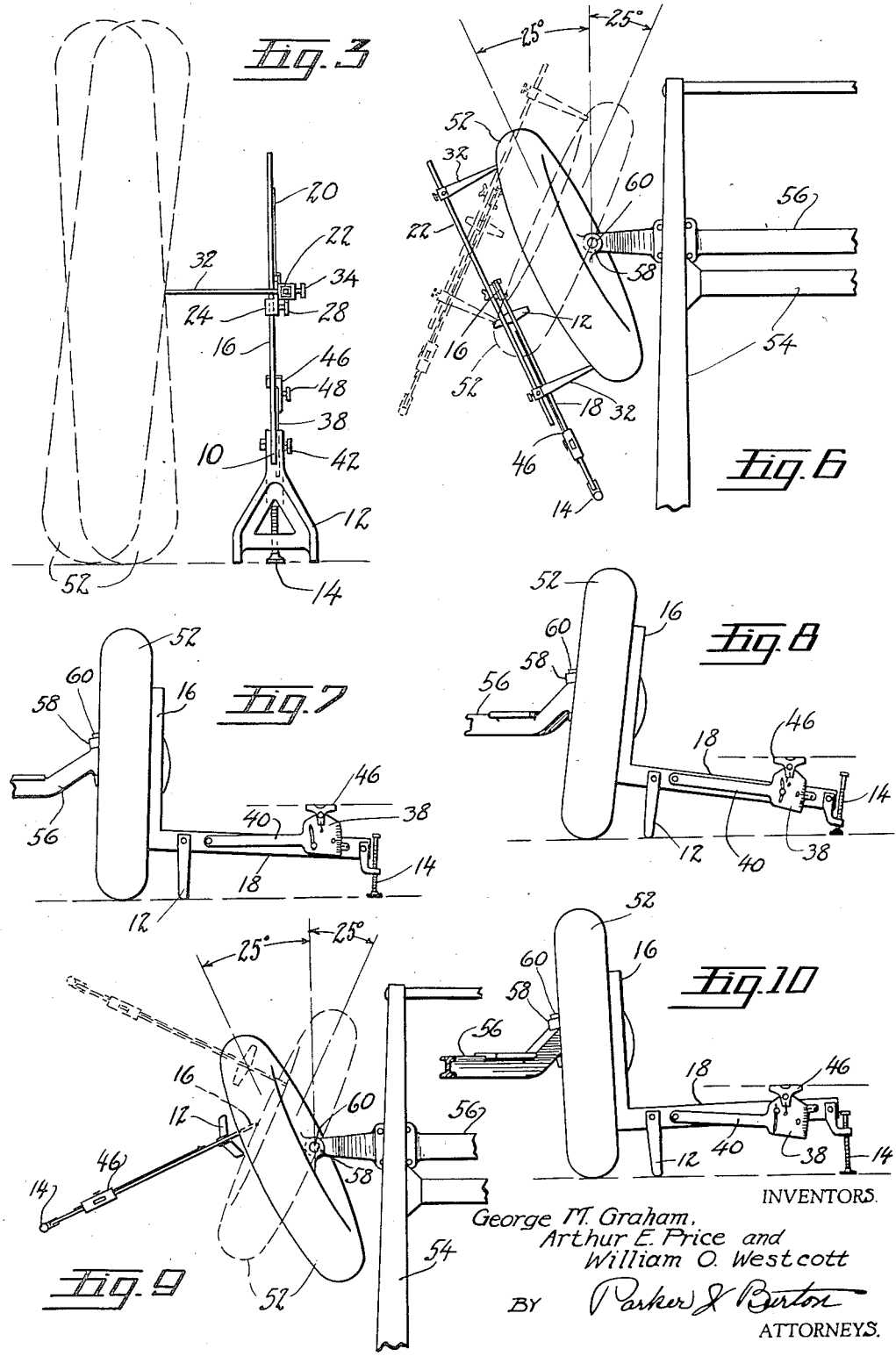

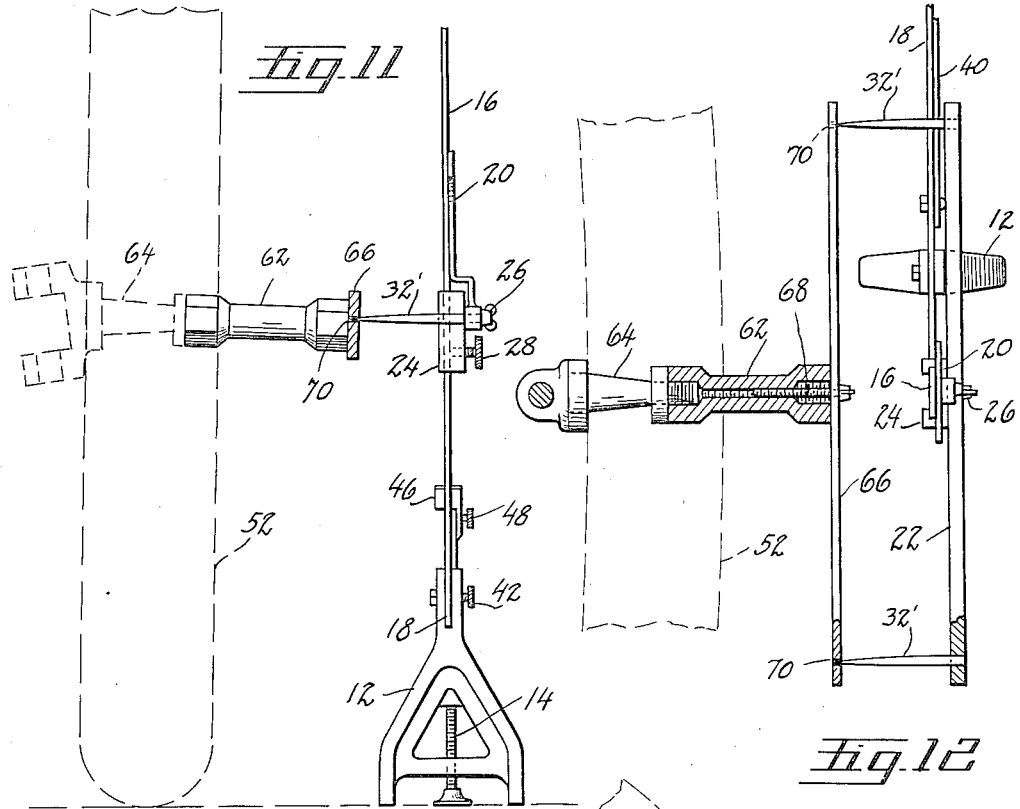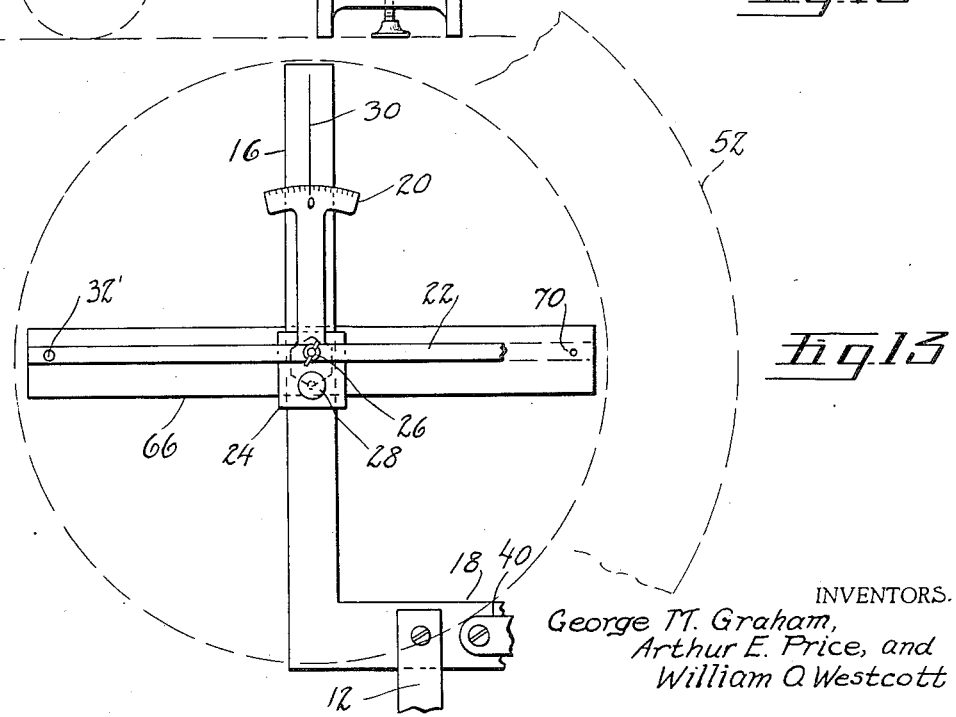

2,029,067

UNITED STATES PATENT OFFICE 2,029,067

WHEEL MEASURING DEVICE

George M. Graham, Detroit, and Arthur E. Price and William O. Westcott, Jackson, Mich., assignors to Hinckley-Myers Company, Jackson, Mich., a corporation of Michigan Application March 7, 1935, Serial No. 9,696

12 Claims. (Cl. 33—203)

This invention relates to an improved method and apparatus for determining and measuring certain characteristics having to do with the mounting of the swivelled road wheels of a vehicle such as the swivelled front wheels of a motor vehicle.

The invention is particularly adapted for the measurement of such factors of swivelled wheel mountings as are commonly known in the art as camber, caster and kin pin angles. In the past relatively large, expensive machines have been used for measuring these angles.

It is an object of this invention to provide a small, compact, inexpensive machine or instrument for measuring the above characteristics. The instrument is portable and readily dismountable and can be inconspicuously shelved when not in use. The machine is especially adapted for those automobile service men who desire small equipment as well as for those to whom space is a premium.

Another object of this invention is to provide a novel method for computing the swivelling angles of the turning wheels of vehicles. This method is simple and accurate so that one having ordinary mechanical knowledge can readily ascertain the angular condition of the swivel mountings.

A meritorious feature of this invention is the provision of a vehicle wheel measuring device which comprises an upright square having protractors adjustably mounted thereon and means for indicating the true horizontal. The square is further provided with an adjustable support which enables the device to be adjusted as a whole to compensate for irregularities in the floor and to assist in determining the angle features of a swivelled wheel. The device is small, portable, and readily shiftable to various positions to measure the swivelling characteristics of the wheel.

A further object of this invention is to provide a novel auxiliary unit capable of being secured to a wheel for the purpose of assisting the wheel aligning instruments in measuring certain swivelling characteristics of the wheel. The unit increases the exactness of the measurement and eliminates guess work on the part of the tester.

Various other objects, advantages, and important features of my invention will now fully appear from the following description of the illustrative embodiment described in the specification, defined in the claims, and shown in the accompanying drawings, wherein:

Figure 1 is a side elevation of the instrument and showing the manner of measuring the king pin angle of a wheel shown in dotted lines therebehind, Fig. 2 is a top view of that shown in Fig. 1 and illustrates the position of the instrument with respect to the wheel for measuring the king pin angle of the wheel, Fig. 3 is a front view of that shown in Fig. 1 and illustrates the various angles the vehicle wheel is tilted with respect to the vertical during the measurement of the king pin angle, Fig. 4 is a detail view showing the manner of mounting a protractor upon the upright section of the square, Fig. 5 is a detail view showing the manner of slidably mounting pointers upon the angularly adjustable arm employed in measuring the king pin angle, Fig. 6 is a top view of the left front of an automobile chassis showing the various positions the instrument assumes with respect to the wheel in the measurement of the king pin angle, Fig. 7 is a front view showing the position assumed by the instrument with respect to the wheel for measuring the camber angle of the wheel, Fig. 8 is a view, looking obliquely from the front of the vehicle, showing the position the instrument assumes with respect to the wheel in the first step of measuring the caster angle of the wheel, Fig. 9 is a top view of the left front of a chassis of an automobile showing the various positions assumed by the wheel and instrument in the measurement of the caster angle of the wheel, Fig. 10 is a view, obliquely from the front of the vehicle, showing the position the instrument assumes with respect to the wheel in the last step of measuring the caster angle of the wheel, Fig. 11 is an end view of the instrument in slightly modified form and a side view of an auxiliary device secured to the spindle of the wheel and capable of assisting the instrument in the measurement of certain angles, Fig. 12 is a top view, partially in section, showing the auxiliary device in detail and the manner of securing the same to the wheel spindle, and Fig. 13 is a side view of a portion of the wheel measuring instrument partially broken away to show the manner of associating the slightly modified form of the instrument with the auxiliary device secured to the wheel.

The instrument comprises a supporting structure in the form of a square 10. The square is supported in upright position at three points by two spaced legs or standards 12 and an adjustable rear leg 14. The upright or vertical section of the square is designated at 16 while the base or horizontal section is denoted at 18.

Secured to the upright 16 of the square is a protractor 20 and an associated arm 22. The protractor and its arm are adjustable for pivotal movement as indicated in Fig. 1 and both are slidably mounted on the upright for vertical adjustment. The arm 22 may be hollow tubing as indicated in Fig. 4 and may be fixed to the protractor 20 by rivets or otherwise. The protractor and its associated arm are slidably mounted upon the upright 16 by means of a sliding member or guide block 24 provided with turned over ends engaging the opposite face of the upright. The protractor and arm are pivotally secured to the guide block 24 by means of a bolt and wing nut assembly 26. A milled head screw 28 is adjustable to tighten the sliding block 24 into fixed position upon the upright. A zero indication 30 is provided for indicating the number of degrees the arm and protractor have turned with respect to the upright. The whole protractor assembly may be removed from the square by loosening the screw 28 and sliding the assembly off the top of the upright.

As shown in Fig. 1 and in detail in Fig. 5 each end of the arm is provided with a sliding member or pointer 32. The pointers extend laterally from the instrument as shown in Figs. 2 and 3 to contact the sides of the tire or wheel. A milled head screw 34 locks the pointer into adjusted position on the arm 22. The top of the arm is graduated in inches as indicated in Fig. 5 and each pointer may be provided with an aperture 36 through which the graduations may be viewed to adjust the pointer upon the arm.

A second protractor 38 is provided on the end of arm 40 pivoted to the horizontal section 18 of the square. An arcuate slot is formed in the protractor and through the slot extends a fastening thumb screw 42 for tightening the protractor upon the base 18 to lock the same in adjusted position. A zero setting 44 is provided on the base for measuring the angle subtended by the protractor with respect to the base.

Pivotally mounted upon the protractor 38 is a spirit level bracket 46 in which is carried a spirit level for indicating the true horizontal. This bracket is adjustable to various positions with respect to the protractor by loosening the thumb screw 48. Marks 50 on both the bracket and the protractor indicate the zero setting of the bracket with respect to the protractor. It is thus apparent that the protractor and bracket are adjustable with respect to each other as well as the base 18.

By setting both the spirit level bracket and the protractor 38 to zero, it is possible to adjust the base 18 to the true horizontal by regulating the adjustment of the rear leg 14 until the bubble in the spirit level centers in the customary manner. This setting can be made irrespective of floor conditions. When such setting is made, the upright 16 assumes the true vertical position.

In the remainder of the figures the instrument is shown assuming various measuring positions with respect to a swivelled front wheel of a vehicle. In these figures reference numeral 52 indicates a tire mounted about a front wheel. In Figs. 6 and 9 a left front section of an automobile chassis is shown. The frame 54 of the car is supported above the axle 56 by means of springs (not shown) in the usual manner. A wheel spindle 58 is yoked in the usual manner and is connected to the end of the axle by means of the customary king pin 60.

In the majority of the present day automobile constructions, the king pin extends at an oblique angle with respect to the chassis of the automobile. That is, the projection of the king pin strikes the ground both forwardly and outwardly from the position of the king pin on the axle. Preferably the projection of the king pin strikes the ground at substantially the contact point of the tire upon the ground. The forward component of this oblique angle is termed the caster angle due to the caster effect it produces upon the wheel. Viewed from the side, the caster angle is the amount in degrees of the backward tilt of the axle and king pin with respect to the vertical. The outward component of this oblique angle is termed the "king pin angle" or inclination. Viewed from the front of the vehicle, the "king pin angle" is the amount in degrees that the top of the king pin is inclined toward the center of the car.

Preparatory to measuring the various angles of the wheel mounting, the two protractors and the spirit level bracket are set at zero as shown in Fig. 1. The rear leg 14 is adjusted until the bubble in the spirit level centers. This compensates for unevenness in the floor. In this condition the square is in true horizontal and vertical position.

To measure the "king pin angle" or lateral tilt of the swivelling axis the foot brake is preferably locked into applied position by a pedal depressor. The hand brake is often unreliable and since the accuracy of this measurement depends upon the spindle moving on its pivot pin without shift or wheel roll, it is preferable to use the foot brake. In the measurement of the "king pin angle" the wheel is turned from a certain angle on one side of the straight forward position of the wheel to the same angle on the other side. The instrument is calibrated to read the "king pin angle" from the angle selected for turning the wheel. For example, the instrument may be calibrated for wheel turns of 25° on either side of the straight forward position of the wheel. It is best to mount the wheel on a turn table or slip plate which is free to move laterally to compensate for any shifting of the wheel contact relative to the ground. To assist in obtaining the exact turns of 25° this turn table or slip plate may be provided with a scale for measuring the angle through which the wheel turns. The wheel in its initial position for measurement assumes the turned out angle of 25° as shown in full lines in Fig. 6.

The instrument is now placed alongside the wheel as also shown in full lines in Fig. 6. The arm 22 is locked into position upon the upright at or near the spindle center of the wheel. The pointers 32 are now adjusted to positions equidistant from center and at about the greatest radius possible opposite the side of the tire. The ends of the pointers are chalked or otherwise marked with some transferable medium, and the ends of the pointers are pushed gently against the side of the tire to impress the chalk marks thereon. This step should be performed without shifting any of the zero settings previously made.

Removing the instrument, the wheel is turned at 25° inward position as indicated in dotted lines in Fig. 6. The instrument is now brought back to its former position with respect to the wheel as also indicated in dotted lines in Fig. 6 with the pointers approximately opposite the chalk marks on the tire. Due to a possible change in floor conditions the spirit level should be checked to determine if the bubble is still centered. In the new position of the instrument, it will be found that the marks on the tire have shifted from their former horizontal position to an angular one as indicated by the dots in Fig. 1. The protractor 20 and its arm are loosened and swung until the ends of the pointers align with the marks on the tire. It may be necessary in order to accomplish this alignment to shift the protractor assembly either up or down the upright. Upon accomplishing such alignment the arm will assume an angle as indicated in the dotted lines in Fig. 1 and the degree of angularity can be read from the protractor scale. The degree will represent the amount of "king pin angle" or the outward inclination of the steering knuckle pin.

The angular displacement of the markings on the tire is produced by the "king pin angle" upon the swivelling of the wheel. The wheel does not rotate to produce this displacement. It pivots in an arc about the inclined axis of the king pin. In doing so, the wheel always maintains the same angular characteristics with respect to the king pin axis. This effect is analogous to the turning of the earth about its inclined axis. When the earth is viewed objectively as a globe turning about an inclined axis, the axis will appear at two opposite positions to be perfectly vertical and the equator will appear to cross this axis at right angles or horizontally. Viewing the globe from other positions, the axis will appear inclined, and the equator, in order to maintain the same right angle with respect to the axis, will appear at an angle to the horizontal. The slant of the equator in this position results from the inclination of the axis, for the former would not slant if the latter were not inclined.

Likewise, the wheel in turning about the inclined steering axis will cause any markings thereon to be displaced with respect to the horizontal. To an observer, the diameters or chords of the wheel will change their angular position with respect to the horizontal as the wheel is turned from the position at which these lines are horizontal. By turning the wheel in such a manner on either side of its forward position, the change in position of such markings on the wheel will be caused by the lateral or side component of the king pin axis. This component as previously stated is termed the "king pin angle".

In order to measure the camber angle of the wheel, the wheel is set in straight forward position. The protractor 20 and its arm are removed from the square by sliding the same off the top of the upright section. The instrument is now brought to the wheel at right angles thereto as shown in Fig. 7. The vertical section 16 of the upright is preferably brought into contact with the side of the tire so that it traverses the tire in the form of a chord. The protractor 38 and the spirit level bracket are adjusted to their zero positions, and the rear leg is adjusted until the spirit level bubble is centered. In this position the upright section 16 will extend vertically and will contact the side of the tire at only one point.

The rear leg is now regulated until the upright section of the square contacts the tire at two or more points. The section is now extending parallel with the plane of the wheel. The two point contact position is shown in Fig. 7. The protractor arm 40 is loosened and swung until the spirit bubble is centered indicating that the arm is in true horizontal position. The protractor is tightened into this position by the thumb screw 42 and the scale on the protractor is read. This is shown in Fig. 7. The reading gives the camber angle of the wheel.

In measuring the caster angle of the king pin, the square assumes substantially the same right angled position with respect to the wheel as in measuring the camber. The protractor assembly 20 is likewise removed for this measurement. As in measuring the "king pin angle", the wheel is measured in two steps, each an equal distance on either side of the straight forward position of the wheel. The turning angle selected is preferably the same as that for ascertaining the "king pin angle", namely 25° on either side of the normal ahead position of the wheel. The turning movements of the wheel as well as the positions of the instrument in this measurement are shown in Fig. 9.

Both the caster and camber readings may be taken by the same scale on protractor 38. The caster angle measurements can be calibrated from a known model wheel assembly and arranged on the protractor 38 so that the readings of the caster and camber substantially coincides. Exact coincidence cannot be obtained, but approximate coincidence is possible which is satisfactory for all practical purposes. It is obvious, however, that two separate scales could be provided on protractor 38, one for measuring the camber angle and the other for measuring the caster angle.

The wheel is turned 25° outwardly and the instrument is brought up against the tire until a single point contact is made therewith as described in the measurement of the camber. The protractor 38 is set at zero and the spirit level should be checked to see that this likewise is at zero. The rear leg is now adjusted until the upright section contacts the side of the tire at two or more points. When this has been accomplished, the spirit level bracket 46 is loosened at 48 and tilted until the bubble centers in the glass. This setting of the instrument indicates the point of travel of the wheel spindle at 25° outward turn. The instrument will assume the position shown in Fig. 8.

The instrument is now withdrawn and the wheel turned to 25° inward position. The instrument is now brought up against the wheel until it contacts the side of the tire as indicated in dotted lines in Fig. 9. A change in slant in the wheel will have occurred upon turning the wheel and it will be found that the upright section makes only a single point contact with the side of the tire. This change in slant or tilt is caused by the angular condition of the king pin axis. The forward component or "caster" of this angular condition is the angle now being measured.

In view of the new floor position assumed by the instrument, the spirit level should be checked to see if it indicates the true horizontal. The rear leg is now regulated until the upright makes a two point contact with the side of the tire. The spirit level bubble will have travelled a considerable distance at this setting. The protractor 38 is now adjusted until the spirit level again centers, at which point it may be locked into position. The scale reading at this point will indicate the caster angle.

The change in slant or tilt during this measurement is shown by comparing Fig. 3 and Fig. 10. The change in tilt as viewed in these figures is effected by the forward component of the king pin angle. This component is termed the "caster" angle. In producing this change of tilt, the plane of the wheel maintains the same angle with respect to the king pin axis as it is turned from outward to inward position. Due to the slant of the king pin, the plane of the wheel shifts or tilts in different directions to maintain its constant angular characteristic with the king pin. By measuring this change of tilt in the manner described above the "caster" angle of the king pin can be determined.

An alternative method may be employed for measuring the caster angle of the king pin. Instead of adjusting the spirit level bracket upon the horizontal protractor as described in the other method, the bracket may be retained in fixed position. In this method, the wheel is turned out 25° and the square is adjusted against the tire for a two point contact as described above. The horizontal protractor 38 is now moved until the bubble in the spirit level centers. At this point the scale reading of the protractor should be noted. Next, the wheel is turned in 25° and the square is brought up against the tire and adjusted for a two point contact thereagainst. The protractor arm is now adjusted until the spirit level again centers. The difference between the scale reading at this point and that at the first reading indicates the caster angle of the king pin.

In Figs. 11, 12, and 13 there is shown an auxiliary device secured to the wheel and associated with a slightly modified form of the instrument previously described. The auxiliary device is a substitute provision for the method of chalking marks on the tire hithertofore described. The instrument is the same in every respect as to that previously described except that the pointers 32′ are now fixedly secured to the arm 22 rather than slidably mounted thereon. The pointers 32′ are equidistant from the pivotal connection of the arm 22 to the upright. As indicated in Fig. 12, the pointers 32′ are roundly tapered at their outer extremities.

The auxiliary device comprises a member or extension nut 62 with either or both ends capable of being fitted or threaded upon the extremity of the wheel spindle 64. A rectangular surface or face plate 66 is removably secured to the free end of the extension nut by means of a bolt 68 threaded into the neck portion of the extension nut. The plate spans a distance equal to the distance separating the pointers 32′ and is provided with apertures or holes 70 aligning with the tapered ends of the pointers. These holes take the place of the chalk marks previously described in connection with the measurement of the "king pin angle".

To determine the angle of "king pin inclination" with the assistance of the auxiliary unit, the wheel to be checked is first turned outward for 25°. The customary hub cap is removed from the wheel and the extension unit 62 including the face plate 66 is threaded on the end of the spindle. The measuring instrument is brought around into position with all the protractor scales set at zero and with the spirit level bubble centered. The face plate is then adjusted until the pointers are able to enter the locating holes at each end of the face plate, at which time the face plate should be firmly tightened to the extension nut. The instrument is then moved away and the wheel turned to 25° inward position. The instrument is then brought around with all scales and the bubble at zero setting and the arm 22 is tilted until the pointers 32′ align and enter the holes in the face plate. The reading of the protractor 20 will give the "king pin angle" or inclination in degrees.

Having illustrated a preferred form of our invention, various modifications will be apparent to those skilled in the art and for that reason we intend to limit ourselves only within the scope of the appended claims.

What we claim:

1. A device for measuring the camber, caster and king pin angles of swivelled vehicle wheels which comprises, in combination, a square, means for supporting said square in upright position so as to provide a horizontal base section and a vertical section extending upwardly therefrom, a protractor adjustably mounted on the vertical section and provided with laterally extending arm sections for making spaced contacts on the vehicle wheel, a second protractor carried by the horizontal section of the square, said supporting means being adjustable to tilt the square with respect to the horizontal.

2. A device for measuring the camber, caster and king pin angles of a swivelled vehicle wheel which comprises, in combination, a square, legs for supporting said square in upright position so that the square is provided with a horizontal base section and a vertical section extending upwardly therefrom, a protractor pivotally and removably mounted on said vertical section and provided with lateral extending arm sections on either side of the vertical section for contacting spaced points on the vehicle wheel, a second protractor pivotally mounted on the horizontal section of the square, means for indicating the true horizontal carried by said last mentioned protractor and adjustable with respect thereto, one of said legs being adjustable for varying the angular setting of the square upon the floor.

3. A device for measuring the king pin angle of a swivelled wheel of a vehicle which comprises a portable structure allowing the same to be shifted to various positions to adapt itself to various angles assumed by the wheel, a protractor pivotally carried by said structure about a horizontal axis and provided with lateral extending arm sections on either side of the axis, and pointers carried on said arm sections and adjustable longitudinally therealong.

4. A device for measuring the king pin angle of a steering wheel of a vehicle which comprises, in combination, an upright support having means for setting the same in true vertical position irrespective of the floor condition, a protractor pivotally carried on said support about a horizontal axis, said protractor provided with lateral extending arm sections on either side of said axis having scale indications thereon, each arm section provided with a member slidably mounted thereon and extending laterally away from the arm sections to indicate points on a wheel.

5. A wheel aligning apparatus comprising, in combination, a square having supports for sustaining the same in upright position, one of said supports being adjustable to vary the angular position of the square in a vertical plane, a protractor pivoted to said square to swing in a vertical plane and measure angles, and means carried by said protractor to indicate the true horizontal, said protractor and means being adapted to measure the angle between the true horizontal position of the square and the angular position the latter must be adjusted to by its support to lie contactingly against the side of the wheel.

6. A wheel aligning apparatus comprising, in combination, a square having legs therefor to support the same in an upright vertical plane, one of said legs being adjustable to tilt the square in a vertical plane, a protractor pivotally secured to said square to swing in a vertical plane and measure angles scaled thereon, and a spirit level pivotally secured to said protractor to indicate the true horizontal, said protractor and spirit level adapted to be pivoted with respect to one another and the square to measure the inclination of the wheel in various turned positions.

7. A vehicle wheel testing device including, in combination, a square, means for supporting the square in upright position, a protractor carried by said square and adjustable with respect thereto, and a spirit level carried by said protractor and adjustable with respect thereto.

8. A vehicle wheel testing device for measuring the caster and camber of a swivelled vehicle wheel which comprises a square, standards for supporting said square in upright vertical position, an arm pivoted at one end to said square to swing in a vertical plane and carrying a protractor scale on the other end thereof to measure angles, and a spirit level secured to said arm to indicate the true level irrespective of floor conditions, said arm with its associated protractor and spirit level adapted to measure both the camber and caster of the wheel.

9. Apparatus for testing wheel alignment which comprises, in combination, a standard, a protractor pivotally secured to said standard about a horizontal axis and provided with lateral extending arm sections on either side of the pivotal connection, a face plate adapted to be secured to the end of the wheel spindle and extend parallel to the plane of the wheel, said face plate provided with holes adjacent each extremity, and pointer means carried adjacent the extremities of the arm sections adapted to enter said holes in the face plate during the testing of the wheel alignment.

10. Apparatus for testing wheel alignment comprising, in combination, an upright, means secured to said upright for angular adjustment about a horizontal axis, means adapted to be secured to the wheel selected for testing and to cooperate with said angularly adjustable means, one of said means provided with a lateral extending gauging element capable of registering with a marking on the other means.

11. An auxiliary unit for assisting in the alignment of vehicle wheels comprising a member capable of being secured to the wheel to be aligned and provided with a flat surface extending parallel to the plane of the wheel.

12. An auxiliary unit for assisting in the testing of wheel alignment comprising an extension nut adapted to be threaded upon the end of the spindle of a wheel, a face plate adjustably secured to said extension nut and extending parallel to the plane of the wheel, said face plate provided with indicating means for assisting wheel alignment devices in determining the alignment of the wheel to which it is secured.

GEORGE M. GRAHAM.
ARTHUR E. PRICE.
WILLIAM O. WESTCOTT.